Sept. 28, 1965    W. K. ROBBINS    3,208,495
NUT LOCK INCLUDING A WASHER ARM FOR
ENGAGING A BOLT THREAD
Filed Jan. 30, 1961
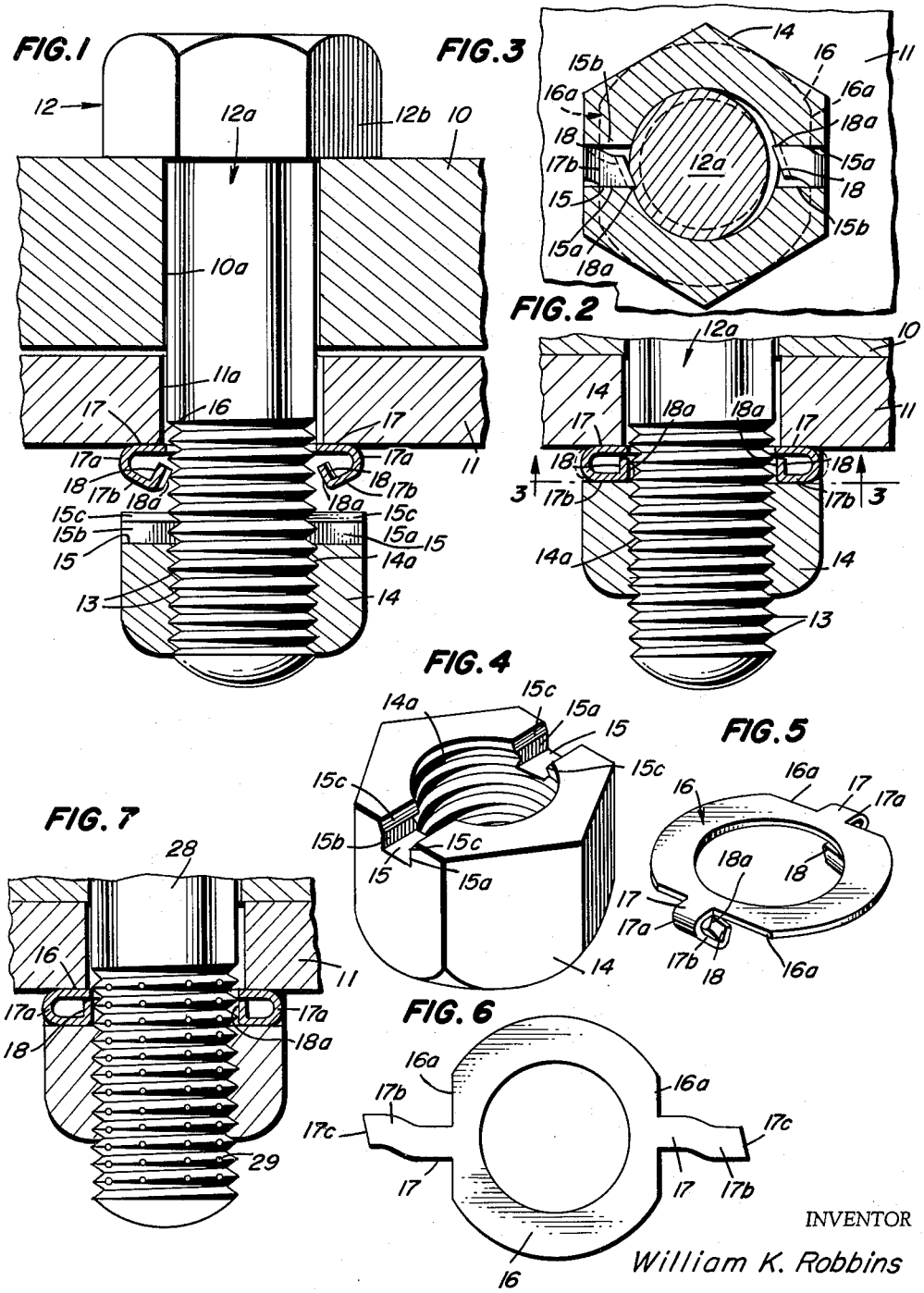
INVENTOR
William K. Robbins
BY Eugene E. Stevens
his ATTORNEY

United States Patent Office 3,208,495
Patented Sept. 28, 1965

3,208,495
NUT LOCK INCLUDING A WASHER ARM FOR ENGAGING A BOLT THREAD
William K. Robbins, 13453 Moorpark St., Sherman Oaks, Calif.
Filed Jan. 30, 1961, Ser. No. 85,793
10 Claims. (Cl. 151—25)

My invention relates to improvements in nut locks for securing a bolt-carried nut against other than wrench-applied backing movement away from a work surface.

Briefly and generally stated, the invention contemplates a novel assembly of nut and lock washer, which latter provides a novel bolt thread-biting means which becomes effective only after the nut has been turned down to firmly compress the washer against a subjacent work surface.

Thus one of the main advantages of my advance in the art is that movement of the washer on the bolt toward and from the work surface is facilitated while avoiding damage to bolt threads between the locked location of the nut and the outer end of the bolt.

Another important feature of the invention resides in the novel formation of the bolt thread-engaging washer-provided prongs which are so formed that their thread-biting ends, after having been actuated by the nut into a certain degree of biting engagement with the bolt threads, will be eased rearwardly slightly upon an over tightening of the nut although still remaining in operative locking engagement with the bolt threads. This is very important as it contributes to the avoidance of bolt thread damage when the nut is backed by wrench-applied force toward the unheaded bolt end. Thus, the bolt will continue to render satisfactory service despite repeated applications and removals of the lock washer and nut.

Another object of the invention is to provide, in a nut-actuated lock washer, bolt thread biting prongs or the like which not only are located at opposite sides of the bolt, but which provide bolt thread-biting portions which, in their operative locking position, are located at opposite sides of the center or diameter line of the bolt. Thus, very considerable wrench-applied force is necessary to turn the nut and washer in a loosening or backing direction because of the necessity for forcing each of the thread-biting prong portions outwardly past the bolt-provided dead center.

A further object is to provide a highly efficient and long lived nut lock as characterized, which can be as cheaply produced in quantity as any of those commonly used for either light or heavy duty.

Invention also resides in certain novel features of construction, combination and arrangement of the several parts and in modes of operation thereof, and the foregoing and various other objects and advantages of my advance in the art will be readily apparent to those familiar with nut lock problems, upon reference to the now preferred example of my inventive concept which is shown in the accompanying drawing.

It is to be understood, however, that the disclosure herein is to be taken as illustrative rather than limitative, since various changes and modifications may be made therein within the spirit and scope of the subject matter claimed hereinafter.

In the drawing, wherein the same reference characters have been used to designate the same parts throughout the several views:

FIG. 1 is a view showing a nut and associated locking washer in section and associated with a bolt for connecting two members together;

FIG. 2 is a view similar to FIG. 1 but showing the nut tightened down to compress the locking washer into operative position against the adjacent surface of one of the bolted together members;

FIG. 3 is a sectional view taken on the line 3—3 of FIG. 2;

FIG. 4 is a perspective view of the nut;

FIG. 5 is a perspective view of the locking washer;

FIG. 6 is a plan view of the washer blank before the legs are bent into the form shown in FIG. 1; and FIG. 7 shows a modified bolt with thread nicks for engagement by lock washer arm terminals.

Referring to the drawing by reference characters, numerals 10 and 11 indicate two members to be bolted together by the bolt 12 which extends through aligned holes 10a, 11a in said members, the bolt having the usual head 12b with the opposite end of its stem 12a threaded as indicated at 13 to receive the nut 14 which provides the bore 14a.

The inner end of the nut 14 has its face cut to provide the aligned washer-arm receiving grooves 15 which extend from the outer edge of the nut to communicate into the threaded (14a) bore thereof. Diagonally opposite walls of the respective grooves or seats 15 are indicated by reference characters 15a, 15b, respectively; and the said groove walls 15a, 15b are inwardly bevelled, as indicated at 15c from the inner end face of the nut 14.

Coming now to the lock washer 16 which will be made of spring steel, it will be noted from the blank shown in FIG. 6 that opposite exterior washer sides 16a are cut away to provide the substantially parallel side edges 16a.

From the washer edges 16a project the arms 17 which provide the laterally offset outer end portions 17b which terminate in the diagonally cut terminal edges 17c, the respective terminal edges 17c providing the diagonally opposite points, as indicated in FIG. 6.

To constitute the respective arms 17 for operative locking use as indicated in FIGS. 1, 2 and 3, the offset end portions 17b are bent inwardly as at 17a at an angle of thirty degrees, or thereabouts, with respect to washer 16 as indicated in FIG. 1. Then inwardly of their diagonally cut free ends 17c, the arm portions 17b are bent inwardly along lines which substantially parallel edges 17c to provide thread opposing terminals 18 of a width which will preferably overlie two adjacent bolt threads 13. Note particularly that terminals 18 provide thread biting end edges 18a at opposite sides of the center line of bolt shank 12a.

Thus, referring to FIGS. 1, 2 and 5, when the washer arms 17 as in FIG. 6 are finally formed for use, each provides an inner arm 17′ and an outer arm 17b, the two respective arms 17′, 17b being connected by the reversely curved portion 17a. Each of the outer arms formed from 17 and indicated at 17b, have, as stated, the inbent terminal 18 which provides the thread engaging edge 18a.

The operation of the lock nut and washer may be summarized as follows:

After the nut 14 and washer 16 have been assembled on the bolt stem 12a as indicated in FIG. 1, the nut 14 is tightened inwardly to engage the inwardly extending arm portions 17b in the grooves 15. After this has been accomplished, the washer 16 of course turns freely with the nut 14, and as the latter approaches the proximate surface of the member 11, the washer 16 is compressed thereagainst while arm portions 17b are compressed inwardly to bring the thread biting edges 18a of arm terminals 18 into engagement with the bolt threads 13.

Particular attention is directed to the fact that the locking arm terminals 18, 18a do not engage the bolt threads 13 until the nut 14 has been turned inwardly sufficiently to bend the outer arm portions 17b inwardly to effect such engagement. In the final operative engagement of arm terminal portions 18a with the bolt threads 13, the inner nut—(14)—end bears against washer 16 to clamp the latter against work piece 11 as in FIG. 2. Now the seat 15 back walls have bent outer arm portions 17b approximately parallel with washer 16 and inner arm portions 17' to bite edges 18a into threads 13 and dispose the inner ends of terminals 18 in very closely spaced opposition to washer 16 as shown in FIGS. 2 and 7.

The assembly has the advantage of preventing damage to the threads of the bolt by over-tightening of nut 14. Thus, it is to be observed that when the nut is over tightened inwardly to possibly engage 18, 18 with washer 16, there will be a slight backing of the arm terminals 18, 18a away from the bolt threads. This is due to compression of the arm portions 17, 17b at the site of bend 17a (see dotted lines in FIG. 2) and to the fact that inner arm portions 17' being integral with washer 16 cannot move outwardly. Also the washer 16 cannot shift either way as it is under equal nut 14 compression adjacent each inner arm portion 17'. However, such withdrawl of the bolt thread biting terminal edges 18a away from the bolt threads 13 will be very slight, or in other words, not sufficient to eliminate the effective locking bite of edges 18a in the bolt threads 13.

If the bolt is heat treated, as is the bolt 28 in FIG. 7, then the threads should be nicked as at 29 for engagement by edges 18a as indicated in FIG. 7, which otherwise is the same as FIG. 2.

The bevelled wall portions 15c of the nut grooves or slots 15 facilitate entry of arm portions thereinto as will be understood.

As shown in FIG. 3, nut slots, or seats, 15 are wider than the outer arm portions 17b and the latter normally engage diagonally opposite side walls 15a to rotate washer 16 with the nut 14 when the latter is tightened toward work piece 11. Thus the outer arm 17b terminals 18 and adjacent portions of outer arm 17b will be free to yield toward the other diagonally opposite seat walls 15b as the thread biting terminals 18b are forced past "dead center" of bolt stem 12a when the nut 14 is backed by wrench-applied force from its FIGS. 2 and 3 position toward the free end of the bolt stem 12a.

The cutting away, as at 16a, of opposite sides of the washer 16 disposes the inner friction area-providing portions of arms 17 closer to nut bore 14a and increases the size of said friction area while facilitating yield of the arms 17, 17b toward the bottom of nut slot 15 when the nut is pulled down tight.

The curved or equivalent connection 17a between the outer arm portion 17b and the inner portion of arm 17, is important. This is so because it is the flattening of said curve 17a, upon over-tightening of nut 14, which results in the slight backing of outer arm portion 17b which eases the bite of terminal end 18a in the bolt threads 13 (see dotted lines in FIG. 2).

By providing the thread biting ends 18a of the faces of terminals 18 of a width to overlie two bolt threads 13, there will be no chance for ineffective engagement of 18a between threads.

From the foregoing, it is believed that the advantages of my development will be fully understood and appreciated by those familiar with nut lock problems.

Having thus described my invention, what I claim is:

1. A nut lock comprising a bolt having a threaded nut-receiving stem, a spring metal washer having an opening receiving the bolt stem, a nut on said bolt stem and providing a threaded bolt hole and a washer-opposing end, a seat opening into said nut end in communication with said bolt hole and having a bottom wall and opposed side walls; an arm member extending from one side of said washer, said arm member comprising inner and outer arms and an intermediate connecting portion therefor, the inner arm located in the plane of the washer and projecting outwardly therefrom, the intermediate inner and outer arm-connecting portion being reversely curved in the direction of the adjacent nut end and bolt stem, the outer arm overlying and inclined away from the plane of the washer toward the bolt stem and providing a free terminal end normally spaced from the bolt stem, the outer arm and intermediate arm-connecting portion adapted to be received in the nut seat, whereby engagement of the nut seat-provided side walls with said seated arm member portions cause the washer to turn and move with the nut toward a work piece, the terminal end of said outer arm providing a bolt thread biting edge of a width in the direction of the bolt stem axis to engage at least one bolt stem thread, the thread-biting edge-providing portion of said outer arm-provided terminal end being further transversely inclined toward the bolt threads from the direction toward which the nut turns to back it off of the bolt stem, whereby to resist such nut turning; the back wall of said nut-provided seat being spaced from the adjacent washer-opposing nut end a distance calculated to actuate the outer arm provided terminal edge into bolt thread-biting engagement upon operative nut-performed tight co-planar clamping of the washer between a work piece and the nut end while leaving the washer and its inner arm spaced from the outer arm and while maintaining the inner and outer arm-connecting portion curved to prevent fracture of same.

2. The structure of claim 1, and wherein the width of said thread biting edge in the direction of the bolt stem axis is such as to engage at least two bolt stem threads.

3. The structure of claim 1 and the proximate sides of at least said outer arm and its terminal end being normally maintained in close adjacency to said particularly mentioned seat-provided side wall, and the second of said seat-provided side walls being spaced away from the opposite side of said terminal end, so that the latter can yield toward said last mentioned wall when the nut is turned in a direction to back it away from said washer, whereby to avoid injury to bolt threads when the nut is backed.

4. The structure of claim 1 and the proximate side of at least said outer arm and its terminal end being normally maintained in close adjacency to said particularly mentioned seat-provided side wall, and the second of said seat-provided side walls being spaced away from the opposite side of said terminal end, so that the latter can yield toward said last mentioned wall when the nut is turned in a direction to back it away from said washer, whereby to avoid injury to bolt threads when the nut is backed, and wherein the width of said thread biting edge in the direction of the bolt stem axis is such as to engage at least two bolt stem threads.

5. The structure of claim 1, and wherein the said washer provides an arm member as specified at each of two diametrically opposite sides, each of said arm members providing an inner and outer arm with intermediate reversely curved connecting portions, there being a washer-adjacent nut end provided seat for the reception of the respective outer arms and intermediate inner and outer arm-connecting portions of the washer-provided arm members, each of the outer arms providing a terminal having a thread-biting edge, said respective thread-biting edge of the outer arms being on opposite sides of the bolt axis and normally engaging the diagonally opposite side walls of said seats which actuate the washer arms.

6. A nut lock comprising a bolt having a threaded nut-receiving stem, a spring metal washer having an opening receiving the bolt stem, a nut on said bolt stem and providing a threaded bolt hole and a washer-opposing end, a seat opening into said nut end in communication with said bolt hole and having a bottom wall and opposed side walls; an arm member extending from one side of said washer, said arm member comprising inner and outer arms and an intermediate connecting portion therefor, the inner arm located in the plane of the washer and projecting outwardly therefrom, the intermediate inner and outer arm-connecting portion being reversely curved in the direction of the adjacent nut end and bolt stem, the outer arm overlying and inclined away from the plane of the washer toward the bolt stem and providing a free terminal end normally spaced from the bolt stem, the outer arm and intermediate arm-connecting portion adapted to be received in the nut seat, whereby engagement of the nut seat-provided side walls with said seated arm member portions cause the washer to turn and move with the nut toward a work piece the terminal end of said outer arm providing a bolt thread biting edge of a width in the direction of the bolt stem axis to engage at least one bolt stem thread, the back wall of said nut-provided seat being spaced from the adjacent washer-opposing nut end a distance calculated to actuate the outer arm provided terminal edge into bolt thread-biting engagement upon operative nut-performed tight coplanar clamping of the washer between a work piece and the nut end while leaving the washer and its inner arm spaced from the outer arm and while maintaining the inner and outer arm-connecting portion curved to prevent fracture of same.

7. The structure of claim 6, and wherein the width of said thread biting edge in the direction of the bolt stem axis is such as to engage at least two bolt stem threads.

8. The structure of claim 6, and the proximate sides of at least said outer arm and its terminal end being normally maintained in close adjacency to said particularly mentioned seat-provided side wall, and the second of said seat-provided side walls being spaced away from the opposite side of said terminal end, so that the latter can yield toward said last mentioned wall when the nut is turned in a direction to back it away from said washer, whereby to avoid injury to bolt threads when the nut is backed.

9. The structure of claim 6, and wherein the said washer provides an arm member as specified at each of two diametrically opposite sides, each of said arm members providing an inner and outer arm with intermediate reversely curved connecting portions, there being a washer-adjacent nut end provided seat for the reception of the respective outer arms and intermediate inner and outer arm-connecting portions of the washer-provided arm members, each of the outer arms providing a terminal having a thread-biting edge, said respective thread-biting edge of the outer arms being on opposite sides of the bolt axis and normally engaging the diagonally opposite side walls of said seats which actuate the washer arms.

10. A nut lock comprising a bolt having a stem providing a threaded nut-receiving end portion, a spring metal washer having an opening receiving the bolt stem, a washer-carried arm comprising an inner portion in the plane of the washer projecting radially outwardly therefrom, a reversely curved mid-portion at the end of said inner portion, and an outer end portion overlying and outwardly inclined from said washer and extending toward but spaced from said bolt stem, the terminal end of said outer end portion being of an axial width to engage at least two stem threads and further being transversely inclined to present a biting edge engagement with the stem threads upon reversed rotation thereof, a nut having a threaded bolt stem-receiving hole and a washer-opposing inner end, a washer arm-receiving seat opening from said inner nut end and communicating with said nut hole, said seat having washer-arm-actuating side and back walls, said back wall being spaced from the inner washer engaging nut end a distance calculated to bring the outer arm end parallel with the plane of the washer and simultaneously into thread-biting engagement upon operative nut-performed tight clamping of the washer against a work piece and the nut end against the washer while leaving the washer and its outer arm spaced from one another.

References Cited by the Examiner
UNITED STATES PATENTS

| | | | |
|---|---|---|---|
| 549,529 | 11/95 | Pfeiffer et al. | 151—3 |
| 1,664,744 | 4/28 | Hartkopf | 151—13 |
| 1,816,192 | 7/31 | Nagano | 151—3 |

EDWARD C. ALLEN, *Primary Examiner.*

HUNTER C. BOURNE, JR., *Examiner.*